May 25, 1926.  
T. B. WEBB ET AL  
WEEDING MACHINE  
Filed Oct. 11, 1924
1,586,169
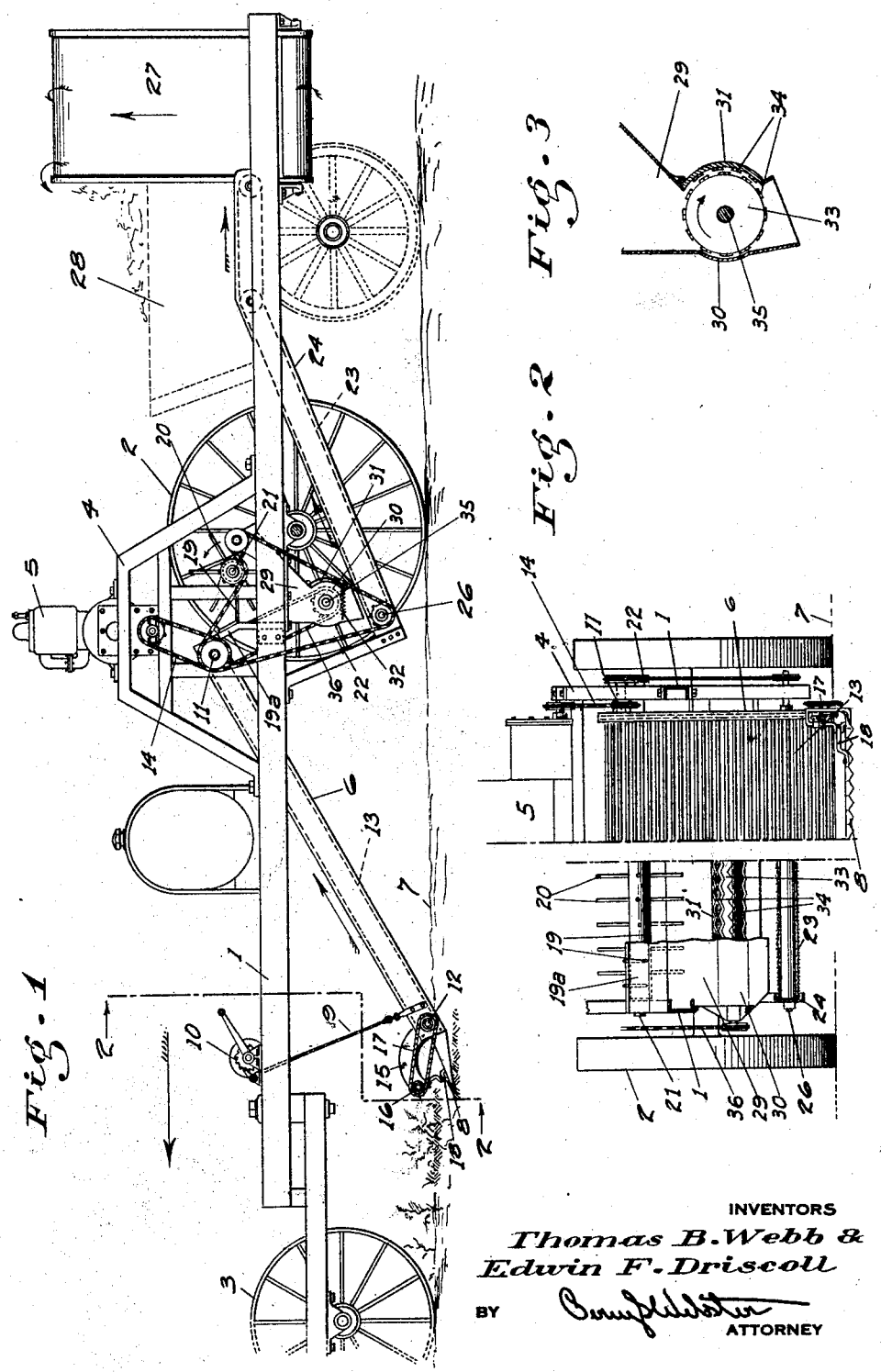
INVENTORS  
*Thomas B. Webb &*  
*Edwin F. Driscoll*  
BY  
ATTORNEY Patented May 25, 1926.

1,586,169

UNITED STATES PATENT OFFICE.

THOMAS B. WEBB AND EDWIN F. DRISCOLL, OF STOCKTON, CALIFORNIA.

WEEDING MACHINE.

Application filed October 11, 1924. Serial No. 743,013.

The principal object of our invention is to produce a device, adapted to be moved along the ground, which will cut all weeds a certain distance below the ground, will then raise the weeds and cause all dirt to be separated therefrom, and will finally deposit the weeds either on a wagon or back on to the surface of the ground. In dry weather this latter is an effective way of killing the weeds, since their roots being on top of the surface and free of all dirt, will soon die.

A further object of the invention is to provide an attachment for the weeder whereby obnoxious seed elements, particularly the root nuts of nut grass, may be ground up and destroyed before being returned to the soil. This is an essential feature in dealing with grass of this character, since if the nuts are not ground up, they will sprout again no matter how long they may first be exposed to the sun.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views:

Fig. 1 is a side elevation of the complete weeding machine.

Fig. 2 is a sectional view on a line 2—2 of Fig. 1 partly broken out to show the beater and grinder elements of the weeding machine. Figure 3 is a detached cross section of the grinder.

Referring now more particularly to the characters of reference on the drawings, the numeral 1 designates the main frame of the device suitably mounted on supporting wheels 2 and arranged to be drawn either under its own power or by a suitably connected vehicle 3, such as a tractor or the like.

The numeral 4 designates a supporting frame on the main frame 1, mounted on which is a power element 5 of any desired type. A conveyor frame 6 is pivotally mounted within the frame 4 and extends at an inclination downwardly to the ground line 7. At its lower end it is provided with a cutter 8 in the form of a sickle bar which is designed to project slidably under the ground surface 7, the depth at which it is so projected under the ground surface being controlled by a cable 9 and windlass or other desired structure 10 mounted on the frame 1. In the upper end of the conveyor 6 is a shaft 11 and in the lower end is a shaft 12 over which operates the conveyor belt 13, the said shaft 11 being driven by means of a chain 14 suitably connected with the power element 5.

An overhanging frame 15 at the lower end of the conveyor 6 supports a shaft 16 driven by a chain or belt 17 from the shaft 12. By means of any suitable gear combination and pitman 18, of a type similar to that used for driving a mower, we drive the sickle bar 8 from the power of the shaft 16 to cut the weeds as the weeder is pulled over the ground surface.

As the weeds are cut they are carried over the conveyor 6 upwardly by the belt 13 and when they reach the upper end of such conveyor 6 they are discharged between beaters consisting of horizontal finger members 19 mounted on a fixed apron $19^a$ under the upper end of conveyor 6. These fingers cooperate with revolving beater bars 20 mounted on a shaft 21 and suitably driven from the power element 5 by means of a chain 22. These beater bars break up and pulverize any clods or soil that has adhered to the weeds, and then the weeds and soil drop upon a belt 23 of a conveyor 24, such belt being driven from the shaft 11 as by the same chain 22 that drives the shaft 21. The belt 23 normally is made up of spaced cleats or bars as is the belt 13, suitably suspended on chains so that the pulverized dirt and soil fall through the same back to the ground while the weeds proper are carried up onto a transversely disposed conveyor 27 which discharges into a wagon 28, or to any other carrying means.

The grinding element we will now describe will not always be used but when certain conditions are encountered where it is desired to grind up seed elements, particularly the root bulbs of nut grass, which if returned whole to the soil, would immediately sprout again. This grinder comprises a transverse hopper 29 below the beater structure which discharges onto the conveyor 24.

Between the ends of the hopper is located a cylindrical casing 30, one side of which is formed as a segment 31 hinged at one end and normally maintained in concentric position relative to the casing by spring means 32. Turnably mounted in the casing is the grinding cylinder 33, said cylinder and casing segment having cooperating raised grinding surfaces, such as indicated at 34.

The shaft 35 of the cylinder is driven by chain or similar means 36 so that the upper face of the cylinder rotates toward the grinding segment.

In this manner, any nuts passing into the hopper 29 are thoroughly ground up before passing to the lower conveyor. At the same time, should any hard foreign matter, such as rocks or scraps of metal pass into the grinder, the segment 30 will yield and allow such matter to pass on through without danger of breaking the grinding mechanism.

The conveyors used may be of any arbitrary type suitable for the purpose, the principal points of the invention being embodied in the cutting mechanism and the beating and grinding apparatus, together with the means for carrying the weeds from the machine while allowing the dirt and the like to return to the ground area.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described our invention what we claim as new and useful and desire to secure by Letters Patent is:

1. A weeding machine including an inclined conveyor up which weeds are carried from the ground, and a beater structure onto which the upper end of the conveyor discharges; said beater structure comprising horizontal and transversely spaced fingers onto which the weeds drop from the conveyor, and a rotatable element mounted beyond the fingers and including a plurality of radially arranged bars passable between the fingers and moving downwardly toward the fingers.

2. A weeding machine including an inclined conveyor up which weeds are carried from the ground, a beater structure onto which the upper end of the conveyor discharges, and a crushing mechanism directly under the beater structure to receive the beaten weeds.

3. A weeding machine including an inclined conveyor up which weeds are carried from the ground, and a crushing structure into which the weeds pass from the conveyor, such structure comprising an enclosure, a rotatable crushing element therein cooperating with the enclosure, and an outwardly yieldable member forming part of the enclosure.

In testimony whereof we affix our signatures.

THOMAS B. WEBB.
EDWIN F. DRISCOLL.